United States Patent [19]

McGinniss

[11] 4,035,273

[45] July 12, 1977

[54] CATHODIC ELECTROCOATING PROCESS

[75] Inventor: Vincent Daniel McGinniss, Valley City, Ohio

[73] Assignee: SCM Corporation, New York, N.Y.

[21] Appl. No.: 689,105

[22] Filed: May 24, 1976

[51] Int. Cl.$^2$ ........................................ C25D 13/06
[52] U.S. Cl. ................................................ 204/181
[58] Field of Search ..................................... 204/181

[56] References Cited

U.S. PATENT DOCUMENTS

| | | | |
|---|---|---|---|
| 3,501,391 | 3/1970 | Smith et al. | 204/181 |
| 3,501,432 | 3/1970 | Wright et al. | 204/181 |
| 3,708,413 | 1/1973 | Kehr et al. | 204/159.14 |
| 3,925,181 | 12/1975 | McGinniss | 204/181 |

*Primary Examiner*—Howard S. Williams
*Attorney, Agent, or Firm*—Jerry K. Mueller, Jr.

[57] ABSTRACT

A heat-curable electrocoating composition containing a polymer having pendant mercaptan groups and cross-linking agent having alpha-,beta-ethylenically unsaturated carbonyl groups can be electrodeposited onto a cathode substrate disposed within an aqueous electrocoating bath. Upon electrodeposition onto the substrate, the mercaptan groups cross-link with the alpha-,beta-ethylenically unsaturated carbonyl groups upon curing to form a fully cured electrodeposited coating on the cathode substrate.

11 Claims, No Drawings

CATHODIC ELECTROCOATING PROCESS

CROSS-REFERENCE TO RELATED APPLICATIONS

This application is cross-referenced to the following commonly assigned applications of applicant: U.S. Ser. No. 560,108 filed on Mar. 19, 1975; and U.S. Ser. No. 689,106 and U.S. Ser. No. 689,104, both filed on even date herewith. The disclosures of the listed applications are expressly incorporated herein by reference.

BACKGROUND OF THE INVENTION

This invention relates to electrodeposition of water-disposed, heat-curable polymers onto a cathode substrate and more particularly to cross-linking mercaptan groups on said electrodeposited polymers with a heat-reactive alpha-,beta-ethylenically unsaturated carbonyl.

Application Ser. No. 560,108 discloses a process for electrodepositing an electrocoating composition onto a cathode substrate and curing the electrocoating by heating. The electrocoating composition provided is a polymer containing pendant primary or secondary amine groups and an alpha-,beta-ethylenically unsaturated carbonyl cross-linking agent which cross-links the electrodeposited polymer upon heating.

It now has been found that an alpha-,beta-ethylenically unsaturated carbonyl cross-linking agent having at least two alpha-,beta-ethylenically unsaturated groups cures a polymer having pendant mercaptan groups, which polymer has been electrodeposited onto a cathode substrate. The pendant mercaptan groups of the polymer can be used both for rendering the polymer water dispersible and for cross-linking with the alpha-,beta-ethylenically unsaturated carbonyl cross-linking agent.

SUMMARY OF THE INVENTION

The electrocoating composition for electrocoating onto a cathode substrate contains an electrocoating polymer having pendant mercaptan groups and a cross-linking agent in an aqueous electrocoating bath. The polymer has at least about 5% by weight pendant mercaptan groups and is dispersed in said aqueous bath. The electrocoating composition also contains at least about 5% by weight of the polymer of an alpha-,beta-ethylenically unsaturated carbonyl cross-linking agent having at least two alpha-,beta-ethylenically unsaturated carbonyl groups. The unsaturated carbonyl groups cross-link upon curing with the electrocoated polymer by addition polymerization with said pendant mercaptan groups to form a cured electrodeposited coating on the cathode substrate.

DETAILED DESCRIPTION OF THE INVENTION

The electrocoating composition generally is an electrocoating polymer or resin selected according to final desired use from a wide variety of known polymers in the electrocoating art.

The polymers contain pendant mercaptan groups. Mercaptan groups can be attached to the polymer by esterification of free hydroxyl groups on the polymer (for example, a polyester) with a mercaptan-terminated acid, such as mercaptopropionic acid. Similarly, mercaptan groups can be introduced into the polymer by reacting pendant primary or secondary amine groups on a polymer with a mercaptan-terminated acid or by reacting the free isocyanate group on a mono-isocyanate-terminated polymer with a mercaptan-terminated acid ester having at least two pendant mercaptan groups. Mercaptan groups can be introduced into the polymer by numerous other methods which are well known in the art and as further exemplified in the Examples of this application. The mercaptan groups are pendantly attached to the polymer. For purposes of this application, pendant mercaptan groups include terminal mercaptan groups. By pendantly attached is meant that such mercaptan groups are attached to the polymer chain or to a pendant side chain of the polymer. The polymer containing pendant mercaptan groups should contain at least about 5% by weight of such pendant mercaptan groups, and up to about 50% if desired.

Representative polymers containing pendant mercaptan groups can be derived from epoxy and epoxy-modified diglycidyl ethers of bisphenol A structures, various aliphatic polyethylene or polypropylene glycol (diglycidyl ether) adducts, and glycidyl ethers of phenolic resin, such epoxy resins being commercially available and commonly used in the electrocoating field. Other useful polymers containing pendant mercaptan groups include polyamide resins, for example, condensation products of dimerized fatty acids coreacted with difunctional amine, such as ethylene diamine, followed by reaction with 3-mercaptopropionic acid. Polyamide resins generally are between about 500 and about 5,000 molecular weight. Further useful electrocoating polymers containing mercaptan groups include acrylic resins having molecular weight of about 1,000 to about 100,000 polyester resins and polyurethane resins both having a molecular weight range of about 500 to about 5,000, vinyl resins, and amine resins. Various other useful electrocoating polymers containing pendant mercaptan groups can be advantageously employed in the electrocoating composition of this application as will become more apparent in the Examples of this application.

The cross-linking agent is an alpha-,beta-ethylenically unsaturated carbonyl having alpha-,beta-ethylenic unsaturation capable of being reactive to cross-link the mercaptan groups on the polymer. The unsaturated cross-linking agent has at least two pendantly attached alpha-,beta-ethylenically unsaturated carbonyl groups of the following structure:

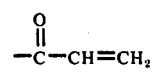

Each unsaturated carbonyl group is pendantly attached to a radical selected from the group consisting of an alkyl, an aryl, an alkyl-aryl, and polymers having a molecular weight up to about 3,000. Pendantly attached unsaturated carbonyl groups are attached to the radical chain or to a side chain of the radical.

Preferably, the unsaturated carbonyl groups are attached to an oxygen molecule and are represented by the following general structure:

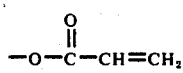

The preferred unsaturated cross-linking agent then is a multiacrylate having at least two pendant acrylate groups. Specific preferred cross-linking agents which are particularly suited to the precepts of this invention can be selected from the group consisting of: ethylene glycol diacrylate, ethylene glycol dimethacrylate, 1,3-butylene glycol dimethacrylate, bisphenol A dimethacrylate, diethylene glycol diacrylate, pentaerythritol triacrylate, pentaerythritol tetraacrylate, trimethylolpropane triacrylate, triethylene glycol dimethacrylate, tetraethylene glycol dimethacrylate, tetraethylene glycol diacrylate, 1,6-hexanedioldiacrylate, melamine acrylate, ethoxylated bisphenol A dimethacrylate, pentaerythritol tetramethacrylate, and polyethylene glycol dimethacrylate.

The preferred unsaturated cross-linking agents can be synthesized by various methods, such as reacting hydroxyl-containing compounds with acrylyl chlorides or methacrylyl chlorides, direct esterification of hydroxyl-containing compounds with ethylmethacrylate, methylmethacrylate and the like. The preferred unsaturated cross-linking agents also can be produced by the transesterification of esters of polyesters with 2-hydroxyethylacrylate, 2-hydroxyethylmethacrylate, hydroxypropylmethacrylate and the like. The preferred unsaturated crosslinking agents can be produced additionally by reacting diisocyanates, polyisocyanates, or isocyanate-terminated polymers and prepolymers with hydroxyl-containing acrylic and methacrylic esters such as, for example, 2-hydroxyethylacrylate or hydroxypropylmethacrylate; by reacting epoxy polymers with acrylic acids or methacrylic acids; and by reacting carboxyl-containing compounds with glycidyl acrylates or glycidyl methacrylates. Further useful unsaturated cross-linking agents include acrylamides, vinyl ketones, and the like.

In practicing this invention, the polymer is rendered water dispersible by conventional techniques such as by adding halogen or alkyl halide, such as, for example, methyl iodide, to the electrocoating polymer to form a sulfonium ion group with the mercaptan groups of the polymer. The electrocoating polymer also can contain pendant amine groups which solubilize the polymer in the aqueous bath when protonated with a protondonating acid. The particular method of solubilizing or water dispersing the electrocoating polymer is not critical to the invention and is accomplished by general techniques well known in the art.

Solubilization or water dispersing of the polymer renders the polymer positively charged so that the polymer can migrate to the cathode substrate and be deposited thereon during the electrodeposition. While the electrocoating polymer is dispersed in the bath, the mercaptan groups will not react with the unsaturated cross-linking agent as the polymer is stable in water.

The water-dispersible polymer is blended with at least about 5% of said unsaturated cross-linking agent by weight of the polymer and up to about 50% if desired. The blend is then dispersed in water to form the electrocoating bath of from about 5 to 20% nonvolatile dispersion. The bath is generally at about 60° to about 125° F., with about 70° to about 95° F. being preferred.

The cathode substrate to be electrocoated then is immersed in the electrocoating bath while an electric potential is maintained therethrough as disclosed in U.S. Pat. No. 3,619,398, the same being incorporated herein by reference. During electrodeposition the positively charged polymer along with the unsaturated cross-linking agent migrate to the cathode substrate and are codeposited thereon. The electric potential applied to the bath is generally between about 20 and about 500 volts, with about 50 to 300 volts being preferred.

The alpha-,beta-ethylenic unsaturation of the cross-linker is heat reactive under the conditions of curing and readily reacts with the pendant mercaptan groups of the polymer in an addition polymerization reaction. Upon such heating a fully cured electrodeposited coating coats the cathode substrate.

The electrodeposited coating on the cathode substrate also can be cured by exposure thereof to ionizing radiation, electron beam curing, as disclosed in U.S. Pat Nos. 3,501,390 and 3,501,391, the same being incorporated expressly herein by reference.

The electrodeposited coating on the cathode substrate additionally can be cured with ultraviolet radiation in the presence of an ultraviolet (UV) sensitizer or photosensitizer. The UV sensitizers are combined with the electrocoating composition and are adapted to be simultaneously co-deposited with the composition onto the cathode substrate during the electrodeposition process. The UV sensitizers are added to the electrocoating composition in amounts of at least about 0.5% and preferably between about 1 and 5% by weight of the polymer.

Useful UV sensitizers or photosensitizers include halogenated polynuclear ketones as disclosed in copending Ser. No. 480,738, filed June 19, 1974, and U.S. Pat. No. 3,827,957, the same incorporated expressly herein by reference. Other suitable UV sensitizers include organic carbonyl compounds selected from alkylphenones, benzophenones, and tricyclic fused ring compounds as disclosed in U.S. Pat. No. 3,750,807 and incorporated expressly herein by reference. Further useful UV sensitizers include carbonylated phenyl nuclear sulfonyl chlorides such as set forth in U.S. Pat. No. 3,827,959, and expressly incorporated herein by reference. Additional useful photosensitizer combinations particularly suitable for pigmented coatings are a combination of sensitizers comprising aromatic carbonyl compounds, aromatic aldehydes or aromatic ketones, and a synergistic sensitizer of about 0.05 to 3% of 2,2'-dithiobis-(benzothiazole) as more particularly set forth in U.S. Pat. No. 3,847,771, and expressly incorporated herein by reference. At least about 0.5% by weight of ultraviolet sensitizer and preferably about 1 to 5% sensitizer is added to the polymer and thoroughly mixed or otherwise dispersed in the polymer phase prior to solubilizing the polymer in aqueous dispersion.

Typical sources of ultraviolet energy ordinarily produce wavelengths in the ultraviolet spectrum that are transmitted through a quartz and such wavelengths are usually between about 1,600 A and 4,000 A. Suitable ultraviolet emittors include various electric arc lamps, plasma arc torch, such as described in U.S. Pat. No. 3,364,387, and lasers having a lasing output in the ultraviolet spectrum as disclosed in copending U.S. Ser. No. 189,254 (now abandoned), filed Oct. 14, 1971, the disclosures of said references are incorporated expressly herein by reference. Other suitable sources of actinic light include quartz mercury lamps, ultraviolet quartz lamps, and high flash lamps. Details of ultraviolet radiation curing the instant electrocoating composition can be as practiced in copending U.S. Ser. No. 480,738, the disclosure of which is incorporated expressly herein by reference.

The cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes. The electrocoating composition can contain opacifying pigments and inert extenders such as, for example, titanium dioxide, zinc oxide, clays such as kaolinite clays, silica, talc, and the like.

The following examples show how the instant invention can be practiced, but should not be construed as limiting the invention. In the specification all parts are parts by weight, all percentages are weight percentages, and all temperatures are in degrees Fahrenheit, unless otherwise expressly indicated.

EXAMPLE 1

The electrocoating polymer was prepared by the solution polymerization of 1 mole of butyl acrylate, 1 mole of methylmethacrylate, and one-half mold of butylthioethylacrylate (prepared by esterifying butylthioethanol with ethylacrylate) in 2-butoxy ethanol-1 solvent with 1 mole of thiolacetic acid chain transfer agent. The thiolacetic ester linkages then were hydrolyzed with acid to form pendant mercaptan groups.

The polymer was dispersed in water by the addition of acid and methyl iodide. The water-dispersed electrocoating polymer was blended with 20 grams of triacrylamido-s-triazine cross-linking agent and the blend let down in water to form an aqueous electrocoating bath of 8% non-volatiles solids. The electrocoating composition was cathodically electrodeposited at 100 volts for 1 minute onto a steel panel immersed in the bath.

The electrocoated panel was removed from the bath, washed with water, and baked at 400° F. for 20 minutes to heat-cure the coating on the panel.

EXAMPLE 2

A hydroxyl-rich polyester was formulated by reacting 2 moles of succinic anhydride, 2 moles of propylene glycol and 1 mole of thiodiethanol. Mercaptan groups were attached to the polyester polymer by the addition of an excess (based on the free hydroxyl content of the polyester polymer) of 3-mercaptopropionic acid thereto. One hundred grams of this mercaptan-terminated polyester polymer was made water dispersible by the addition of methyl iodide. The water-dispersible electrocoating polyester polymer was blended with 30 grams of melamine acrylate cross-linker (2.7 acrylate functionality) and the blend added to water to form an aqueous electrocoating bath of 8% non-volatiles dispersion. A steel panel was immersed in the bath as the cathode and the electrocoating composition electrodeposited thereon at 60 volts for 2 minutes. The electrocoated panel was removed from the bath, washed with water, and baked at 360° F. for 15 minutes to fully cure the coating on the panel.

EXAMPLE 3

One mole of DER 664 epoxy resin (Dow Epoxy Resin, epoxy equivalent weight of 900, Dow Chemical Company) was reacted with 1 mole of nonyl phenol in 2-butoxy ethanol-1 solvent in the presence of 0.5% benzyldimethylamine catalyst followed by a further reaction with the reaction product of 1 mole of butylthioethanol and 1 mole of toluenediisocyanate. The product urethane-modified epoxy resin then was reacted with 1 mole of trimethylolpropane tri-(beta-mercaptopropionate) in order to attach pendant mercaptan groups.

The mercaptan-functional, urethane-modified epoxy electrocoating polymer was acidified with acetic acid and 1 mole of methyl iodide, blended with 30% by weight of pentaerythritoltriacrylate cross-linking agent, and the blend dispersed in water to form an 8% non-volatiles electrocoating bath. The electrocoating composition was cathodically electrodeposited onto a steel cathode panel and the electrodeposited coating heat-cured in a manner as previously described.

EXAMPLE 4

Two moles of toluene diisocyanate were reacted with 0.75 moles of poly(tetramethylene-etherglycol) (molecular weight of 2,000) and 0.25 moles of thiodiethanol followed by further reaction with 1 mole of propanol to produce a monoisocyanateterminated urethane resin. This resin was reacted with 1 mole of the triester of 3-mercaptopropionic acid with trimethylolpropane to produce a mercaptan-functional urethane electrocoating polymer.

One hundred grams of the electrocoating polymer were acidified with acetic acid and 0.25 moles of methyl iodide and blended with 20 grams of triacrylamide-s-triazine cross-linking agent. The blend was added to water to form an electrocoating bath of 8% non-volatile dispersion. A steel panel was cathodically electrocoated with the electrocoating composition (mercaptan-functional urethane electrocoating polymer and cross-linking agent) in a manner similar to that of the previous Examples, the coated substrate washed with water, and baked at 400° F. for 25 minutes. A fully cured coating covered the steel panel.

EXAMPLE 5

An amine-terminated polyamide resin was formulated from 2 moles of 1,6-hexyldiamine and 1 mole of adipic acid. Mercaptan groups were attached to the polyamide resin by a further reaction of the resin with 2 moles of 3-mercaptopropionic acid. One hundred grams of this mercaptan-functional polyamide electrocoating resin were acidified with lactic acid and methyl iodide, blended with 20 grams of pentaerythritoltriacrylate cross-linker, and added to water to form an electrocoating bath of 10% non-volatiles dispersion.

The electrocoating composition comprising the water-dispersed polyamide resin and cross-linker was cathodically electrodeposited onto a steel panel at 100 volts for 1 minute. The coated panel was removed from the bath, washed with water, and baked at 250° F. for 40 minutes. A fully cured coating having no mercaptan odor covered the panel.

EXAMPLE 6

One mole of 1,6-hexanediamine was reacted with 1 mole of adipic acid to form an amine-terminated polyamide resin. This resin was reacted with 1 mole of 3-mercaptopropionic acid to form a polyamide resin having both pendant mercaptan and pendant amine groups. The electrocoating polymer was a blend of 50% by weight each of this polyamide resin and the epoxy polymer of Example 7.

A polymer-acrylate cross-linking agent was formulated by reacting 2 moles of succinic anhydride with 1 mole of polyoxyethylene glycol (molecular weight of about 1,540), followed by a further reaction with 2 moles of glycidyl acrylate.

The electrocoating polymer blend was water dispersed in a manner similar to the previous Examples and added with the polyether-polyester-acrylate cross-linking agent to form a 20% non-volatiles aqueous electrocoating bath. The electrocoating composition was cathodically electrodeposited onto a steel panel at 100 volts for 2 minutes, washed with water, and baked at 400° F. for 35 minutes. A hard, flexible, solvent-resistant coating covered the panel.

EXAMPLE 7

One mole of DER 664 epoxy resin was reacted with one mole of methylethanol followed by further reaction with trimethylolpropane tri-(beta-mercaptopropionate) to produce a mercaptan-functional epoxy resin. This resin was made water dispersible, blended with 10% by weight each of trimethylolpropanetriacrylate and pentaerythritoltriacrylate, and the blend added to water to form an electrocoating bath of 8% non-volatiles dispersion.

The electrocoating composition was cathodically electrodeposited onto a steel panel, removed from the bath, and washed with water. The coated panel then was heated at a sufficiently low temperature (about 150° F.) to effect a flow-out of the coating. The flowed-out panel was subjected to electron beam radiation from an electrocurtain (laboratory model, Energy Sciences, Inc.) under the following conditions: terminal voltage of 150 kilovolts, current of 10 milliamperes, dose of 10 megarad, and linespeed of 10 feet per minute. Upon said electron beam irradiation, a fully cured coating covered the panel.

EXAMPLE 8

To the electrocoating bath of Example 7, ten grams of benzophenone UV sensitizer was added. A steel panel was cathodically electrocoated, and the coating flowed-out in the manner described in Example 7.

The flowed-out panel was exposed for 10 seconds to ultraviolet radiation at a distance of 3 inches from a 3-bulb Ashdee model ultraviolet curing unit, each bulb producing 200 watts per inch on its surface. Upon the ultraviolet irradiation a fully cured coating covered the panel.

EXAMPLE 9

To the electrocoating bath of Example 5 was added 10% benzophenone ultraviolet sensitizer. Cathodic electrodeposition of the electrocoating composition, heat flowing out of the electrodeposited coating, and ultraviolet radiation exposure was performed in the manner described in Example 8 to yield a fully cured coating covering the panel.

EXAMPLE 10

Two moles of toluene diisocyanate were reacted with 1 mole of poly-(tetramethylene ether glycol) (molecular weight of 2,000) followed by a further reaction with 1 mole of dimethylethanolamine. This monoisocyanate-terminated urethane resin was reacted with one mole of trimethylolpropane tri(beta-mercaptopropionate) in order to pendantly attach mercaptan functionality to the urethane resin.

The electrocoating urethane resin was rendered water dispersible blended with the pentaerythritoltetraacrylate cross-linking agent, and added to water to form the electrocoating bath. A steel panel was cathodically electrocoated and the electrodeposited coating heat-cured in a manner similar to that described above.

EXAMPLE 11

An acrylic copolymer was synthesized by the solution polymerization of 1 mole of butyl acrylate, 1 mole of diethylaminoethylacrylate, and 1 mole of methylmethacrylate. This copolymer was reacted with the ester of trimethylolpropane with beta-mercaptopropionate to form the electrocoating polymer.

The electrocoating polymer was neutralized with lactic acid, blended with melamine acrylate, and added to water to form the aqueous electrocoating bath. A steel panel was cathodically electrocoated with the electrocoating composition and the coating on the panel heat-cured in a manner similar to that described above.

I claim:

1. A process for electrodeposition of a cathodic electrocoating composition onto a cathode substrate disposed within an aqueous electrocoating bath to form a curable electrodepositing coating on said cathode substrate, which comprises:

cathodically electrodepositing said electrocoating composition dispersed in said bath onto said cathode substrate under cathodic electrocoating conditions, said electrocoating composition comprising (a) a water-dispersed electrocoating polymer having at least about 5% by weight pendant mercaptan groups, and (b) at least about 5% by weight of said polymer of an alpha-,beta-ethylenically unsaturated carbonyl cross-linking agent having at least two alpha-,beta-ethylenically unsaturated carbonyl groups; and curing said electrodeposited coating on said cathode substrate, said cross-linking agent cross-linking said polymer to form a cured electrodeposited coating on said substrate.

2. The electrodeposition process of claim 1 wherein said curing is by heating.

3. The electrodeposition process of claim 2 wherein said coating is cured by heating at a temperature of at least about 100° F.

4. A cathode substrate having a heat-cured electrodeposited coating thereon from the electrocoating process of claim 2.

5. The electrodeposition process of claim 1 wherein said electrocoating composition includes at least about 0.5% by weight of an ultraviolet photosensitizer and said curing is by ultraviolet radiation.

6. A cathode substrate having an ultraviolet radiation cured electrodeposited coating thereon from the electrocoating process of claim 5.

7. The electrodeposition process of claim 1 wherein said curing is by ionizing radiation.

8. The electrodeposition process of claim 1 wherein said electrocoating polymer is dispersed in said bath by adding alkyl halide or halogen thereto to form sulfonium ion groups on said polymer from said mercaptan groups.

9. The electrodeposition process of claim 1 wherein said electrocoating polymer also has pendant amine groups and said amine groups are protonated with proton-donating acid to disperse said polymer in said aqueous bath, said protonated amine groups becoming deprotonated upon electrodeposition of said polymer onto said cathode substrate.

10. A process for electrodeposition of a cathodic electrocoating composition onto a cathode substrate disposed within an aqueous electrocoating bath to form a curable electrodepositing coating on said cathode substrate, which comprises:

cathodically electrodepositing said electrocoating composition dispersed in said bath onto said cathode substrate under cathodic electrocoating conditions, said electrocoating composition comprising (a) a water-dispersed electrocoating polymer having at least about 5% by weight pendant mercaptan groups, and (b) at least about 5% by weight of said polymer of an acrylate cross-linking agent having at least two pendant acrylate groups; and curing said electrodeposited coating on said cathode substrate, said cross-linking agent cross-linking said polymer to form a cured electrodeposited coating on said substrate.

11. A process for electrodeposition of a cathodic electrocoating composition onto a cathode substrate disposed within an aqueous electrocoating bath to form a curable electrodepositing coating on said cathode substrate, which comprises:

cathodically electrodepositing said electrocoating composition dispersed in said bath onto said cathode substrate under cathodic electrocoating conditions, said electrocoating composition comprising (a) a water-dispersed electrocoating polymer having at least about 5% by weight pendant mercaptan groups, and (b) at least about 5% by weight of said polymer of an acrylamide cross-linking agent having at least two pendant acrylamide groups; and curing said electrodeposited coating on said cathode substrate, said cross-linking agent cross-linking said polymer to form a cured electrodeposited coating on said substrate. electrocoating polymer having at least about 5% by weight pendant mercaptan groups, and (b) at least about 5% by weight of said polymer of an acrylamide cross-linking agent having at least two pendant acrylamide groups; and curing said electrodeposited coating on said cathode substrate, said cross-linking agent cross-linking said polymer to form a cured electrodeposited coating on said substrate.

* * * * *

UNITED STATES PATENT AND TRADEMARK OFFICE
CERTIFICATE OF CORRECTION

PATENT NO. : 4,035,273

DATED : July 12, 1977

INVENTOR(S) : Vincent Daniel McGinniss

It is certified that error appears in the above-identified patent and that said Letters Patent are hereby corrected as shown below:

Column 1, line 15, "disposed" should read -- dispersed --.

Column 10, line 13, the words "electrocoating polymer" should be deleted.

Column 10, lines 14 through 22 should be deleted.

Signed and Sealed this

Eighth Day of November 1977

[SEAL]

Attest:

RUTH C. MASON
Attesting Officer

LUTRELLE F. PARKER
Acting Commissioner of Patents and Trademarks